Thomas Bisbing's "Impr'mt in Churn"

No. 71958

PATENTED
DEC 10 1867

Witnesses
Theo Finske
Wm Spewrn

Inventor
Thos Bisbing
Per [signature]

United States Patent Office.

THOMAS BISBING, OF BUCKSTOWN, PENNSYLVANIA.

Letters Patent No. 71,958, dated December 10, 1867.

IMPROVEMENT IN CHURNS.

The Schedule referred to in these Letters Patent and making part of the same.

TO ALL WHOM IT MAY CONCERN:

Be it known that I, THOMAS BISBING, of Buckstown, in the county of Somerset, and State of Pennsylvania, have invented a new and useful Improvement in Churn; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for it object to furnish an improved churn, conveniently and easily operated, and which will do its work quickly and thoroughly; and it consists in the construction of the dasher, and in the combination of the removable frame, sliding frame, ratchet-bar, and pinion-wheel with each other, with the body of the churn, and with the dasher-shaft; the whole being constructed and arranged as hereinafter more fully described.

Figure 1:
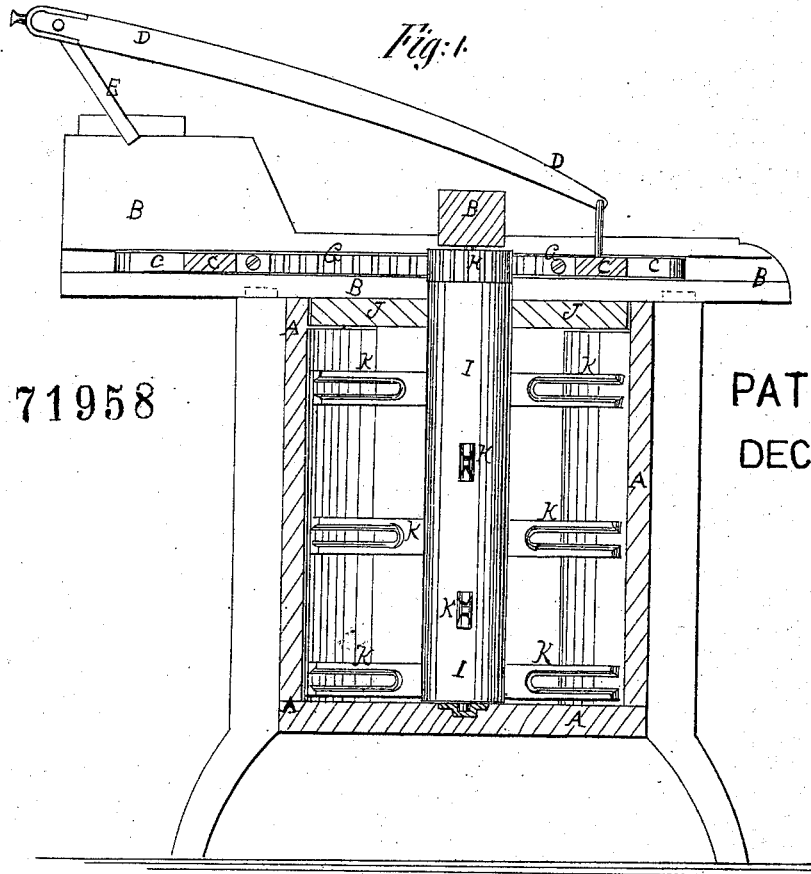
Figure 1 is a vertical section of my improved churn taken through the line $x$ $x$, fig. 2.
Figure 2:
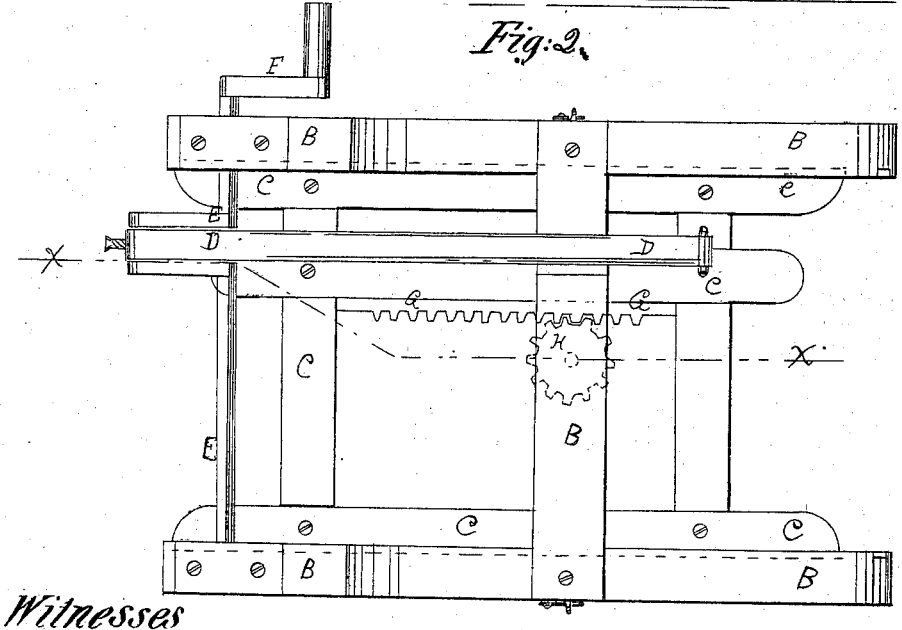
Figure 2 is a top view of the same.

A is the body of the churn, which, if made square, should have its angles filled with triangular blocks, so as to bring the milk more fully under the action of the reciprocating dasher. B is a frame fitted upon and removably attached to the top of the churn-body A, or of the frame by which the said churn-body is supported. Upon the inner sides of the side bars of the frame B, are formed horizontal grooves, in which the frame C slides back and forth. To the frame C, near one end, is pivoted the end of the connecting-rod D, the other end of which is pivoted to a crank formed upon the crank-shaft E, which revolves in bearings in the frame B, and to which motion is given by means of the crank F. Or, if desired, motion may be communicated to the sliding frame C by means of a lever. G is a ratchet-bar attached to the sliding frame C in such a position that its teeth may mesh into the teeth of the pinion-wheel H, attached to the end of the dasher-shaft I, so as to communicate to the said shaft a reciprocating rotary motion, as the sliding frame is moved back and forth. The lower end of the dasher-shaft I is pivoted to the centre of the bottom of the churn, and its upper end passes up through the cover J, and is pivoted to a cross-bar of the frame B. K are the dasher-blades which project radially from opposite sides of the shaft I, and should be so arranged that the vertical distance between each pair of arms or blades may be about equal to the vertical thickness of the said arms. The projecting parts of the arms or blades K are slotted horizontally, as shown in fig. 1. By this construction and arrangement of the dasher-blades, the currents of milk caused by each of the blades will be encountered and broken up by the others, so as to throw the entire contents of the churn into a very violent agitation, bringing the butter in a very short time.

What I claim as new, and desire to secure by Letters Patent, is—

The combination of the removable frame B, sliding frame C, ratchet-bar G, and pinion-wheel H, with each other, with the body A of the churn, and with the dasher-shaft I, substantially as herein shown and described, and for the purpose set forth.

THOMAS BISBING.

Witnesses:
M. V. SORBER,
C. W. WILLIAMSON.